US010363632B2

(12) United States Patent
Hsu (10) Patent No.: US 10,363,632 B2
(45) Date of Patent: Jul. 30, 2019

(54) TIME OF FLIGHT CAMERA FOR WELDING MACHINE VISION

(71) Applicant: Illinois Tool Works Inc., Chicago, IL (US)

(72) Inventor: Christopher Hsu, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 721 days.

(21) Appl. No.: 14/749,057

(22) Filed: Jun. 24, 2015

(65) Prior Publication Data
US 2016/0375524 A1 Dec. 29, 2016

(51) Int. Cl.
| | |
|---|---|
| *B23K 31/02* | (2006.01) |
| *B23K 9/095* | (2006.01) |
| *B23K 26/03* | (2006.01) |
| *B23K 9/127* | (2006.01) |
| *B23K 26/044* | (2014.01) |
| *B23K 37/00* | (2006.01) |

(52) U.S. Cl.
CPC .............. *B23K 31/02* (2013.01); *B23K 9/095* (2013.01); *B23K 9/127* (2013.01); *B23K 26/03* (2013.01); *B23K 26/044* (2015.10); *B23K 37/00* (2013.01)

(58) Field of Classification Search
CPC .... B23K 26/03; B23K 26/044; B23K 26/032; B23K 31/02; B23K 37/00; B23K 9/095; B23K 9/127
See application file for complete search history.

(56) References Cited

U.S. PATENT DOCUMENTS

| | | | |
|---|---|---|---|
| 3,652,824 | A | 3/1972 | Okada |
| 4,021,840 | A | 5/1977 | Ellsworth et al. |

(Continued)

FOREIGN PATENT DOCUMENTS

| | | |
|---|---|---|
| CA | 2725719 A1 | 6/2012 |
| CA | 2778699 | 11/2012 |

(Continued)

OTHER PUBLICATIONS

Larkin et al., "3D Mapping using a ToF Camera for Self Programming an Industrial Robot", Jul. 2013, IEEE, 2013 IEEE/ASME International Conference on Advanced Intelligent Mechatronics (AIM), pp. 494-499.*

(Continued)

*Primary Examiner* — Geoffrey S Evans
(74) *Attorney, Agent, or Firm* — McAndrews, Held & Malloy, Ltd.

(57) ABSTRACT

A machine-vision-assisted welding system comprises welding equipment, a time of Flight (ToF) camera operable to generate a three-dimensional depth map of a welding scene, digital image processing circuitry operable to extract welding information from the 3D depth map, and circuitry operable to control a function of the welding equipment based on the extracted welding information. The welding equipment may comprise, for example, arc welding equipment that forms an arc during a welding operation, and a light source of the ToF camera may emit light whose spectrum comprises a peak that is centered at a first wavelength, wherein the first wavelength is selected such that a power of the peak is at least a threshold amount above a power of light from the arc at the first wavelength.

26 Claims, 9 Drawing Sheets

(56) References Cited

U.S. PATENT DOCUMENTS

| | | |
|---|---|---|
| 4,280,137 A | 7/1981 | Ashida |
| 4,477,712 A | 10/1984 | Linguist |
| 4,577,796 A | 3/1986 | Powers et al. |
| 4,641,292 A | 2/1987 | Tunnell et al. |
| 4,733,051 A | 3/1988 | Nadeau et al. |
| 4,812,614 A | 3/1989 | Wang et al. |
| 5,275,327 A | 1/1994 | Watkins |
| 5,380,978 A | 1/1995 | Pryor |
| 5,572,102 A | 11/1996 | Goodfellow et al. |
| 5,580,475 A | 12/1996 | Sakai |
| 5,923,555 A | 7/1999 | Bailey et al. |
| 5,932,123 A | 8/1999 | Marhofer et al. |
| 5,978,090 A | 11/1999 | Burri et al. |
| 6,122,042 A | 9/2000 | Wunderman et al. |
| 6,240,253 B1 | 5/2001 | Yamaguchi |
| 6,242,711 B1 | 6/2001 | Cooper |
| 6,572,379 B1 | 6/2003 | Sears |
| 6,587,186 B2 | 7/2003 | Bamji et al. |
| 6,734,393 B1 | 5/2004 | Friedl |
| 7,534,005 B1 | 5/2009 | Buckman |
| 7,926,118 B2 | 4/2011 | Becker et al. |
| 7,962,967 B2 | 6/2011 | Becker et al. |
| 7,987,492 B2 | 7/2011 | Liwerant |
| 8,274,013 B2 | 9/2012 | Wallace |
| 8,316,462 B2 | 11/2012 | Becker et al. |
| 8,502,866 B2 | 8/2013 | Becker et al. |
| 8,569,655 B2 | 10/2013 | Cole |
| 8,605,008 B1 | 12/2013 | Prest et al. |
| 8,680,434 B2 | 3/2014 | Stoger et al. |
| 8,808,164 B2 | 8/2014 | Hoffman |
| 8,826,357 B2 | 9/2014 | Fink |
| 8,915,740 B2 | 12/2014 | Zboray et al. |
| 8,934,029 B2 | 1/2015 | Nayar |
| 8,957,835 B2 | 2/2015 | Hoellwarth |
| 8,964,298 B2 | 2/2015 | Haddick |
| RE45,398 E | 3/2015 | Wallace |
| 8,992,226 B1 | 3/2015 | Leach et al. |
| 9,056,365 B2 | 6/2015 | Hoertenhuber |
| 9,097,891 B2 | 8/2015 | Border |
| 9,101,994 B2 | 8/2015 | Albrecht |
| 9,235,051 B2 | 1/2016 | Salter |
| 9,244,539 B2 | 1/2016 | Venable |
| 2002/0017752 A1 | 2/2002 | Levi |
| 2004/0034608 A1 | 2/2004 | de Miranda et al. |
| 2004/0189675 A1 | 9/2004 | Pretlove |
| 2005/0001155 A1 | 1/2005 | Fergason |
| 2005/0099102 A1 | 5/2005 | Villarreal |
| 2005/0103767 A1 | 5/2005 | Kainec |
| 2005/0161357 A1 | 7/2005 | Allan |
| 2005/0199605 A1 | 9/2005 | Furman |
| 2006/0087502 A1 | 4/2006 | Karidis |
| 2006/0176467 A1* | 8/2006 | Rafii ................... G01C 3/08 356/4.07 |
| 2006/0207980 A1 | 9/2006 | Jacovetty |
| 2006/0213892 A1 | 9/2006 | Ott |
| 2006/0281971 A1 | 12/2006 | Sauer |
| 2007/0119824 A1* | 5/2007 | Deaton, Jr. ........... C21D 10/005 219/121.6 |
| 2007/0187378 A1 | 8/2007 | Karakas |
| 2008/0083351 A1 | 4/2008 | Lippert |
| 2008/0158502 A1 | 7/2008 | Becker |
| 2008/0187235 A1 | 8/2008 | Wakazono |
| 2008/0314887 A1 | 12/2008 | Stoger |
| 2009/0014500 A1 | 1/2009 | Cho et al. |
| 2009/0134203 A1 | 5/2009 | Domec et al. |
| 2009/0231423 A1 | 9/2009 | Becker |
| 2009/0276930 A1 | 11/2009 | Becker et al. |
| 2009/0298024 A1 | 12/2009 | Batzler et al. |
| 2010/0206851 A1 | 8/2010 | Nakatate |
| 2010/0223706 A1 | 9/2010 | Becker et al. |
| 2010/0262468 A1* | 10/2010 | Blankenship ........ B23K 9/1062 705/7.36 |
| 2011/0091846 A1 | 4/2011 | Kreindl |
| 2011/0108536 A1 | 5/2011 | Inada |
| 2011/0117527 A1 | 5/2011 | Conrardy et al. |
| 2011/0187859 A1 | 8/2011 | Edelson |
| 2011/0220619 A1 | 9/2011 | Mehn |
| 2011/0227934 A1 | 9/2011 | Sharp |
| 2011/0309236 A1 | 12/2011 | Tian |
| 2012/0012561 A1 | 1/2012 | Wiryadinata |
| 2012/0074114 A1 | 3/2012 | Kawamoto |
| 2012/0176659 A1 | 7/2012 | Hsieh |
| 2012/0180180 A1 | 7/2012 | Steve |
| 2012/0189993 A1 | 7/2012 | Kindig |
| 2012/0229632 A1 | 9/2012 | Hoertenhuber |
| 2012/0241429 A1 | 9/2012 | Knoener |
| 2012/0249400 A1 | 10/2012 | Demonchy |
| 2012/0262601 A1 | 10/2012 | Choi |
| 2012/0291172 A1 | 11/2012 | Wills |
| 2012/2298640 | 11/2012 | Conrardy |
| 2013/0050432 A1 | 2/2013 | Perez |
| 2013/0081293 A1 | 4/2013 | Delin et al. |
| 2013/0112678 A1* | 5/2013 | Park ................... B23K 9/0953 219/148 |
| 2013/0189657 A1 | 7/2013 | Wallace |
| 2013/0189658 A1 | 7/2013 | Peters |
| 2013/0206740 A1 | 8/2013 | Pfeifer et al. |
| 2013/0206741 A1 | 8/2013 | Pfeifer et al. |
| 2013/0208569 A1 | 8/2013 | Pfeifer et al. |
| 2013/0215281 A1 | 8/2013 | Hobby et al. |
| 2013/0229485 A1 | 9/2013 | Rusanovskyy |
| 2013/0234935 A1 | 9/2013 | Griffith |
| 2013/0291271 A1 | 11/2013 | Becker et al. |
| 2013/0321462 A1 | 12/2013 | Salter |
| 2013/0345868 A1* | 12/2013 | One ................... B23K 9/095 700/252 |
| 2014/0014637 A1 | 1/2014 | Hunt |
| 2014/0020147 A1 | 1/2014 | Anderson |
| 2014/0059730 A1 | 3/2014 | Kim |
| 2014/0092015 A1 | 4/2014 | Xing |
| 2014/0134579 A1 | 5/2014 | Becker |
| 2014/0134580 A1 | 5/2014 | Becker |
| 2014/0144896 A1 | 5/2014 | Einav |
| 2014/0159995 A1 | 6/2014 | Adams |
| 2014/0183176 A1 | 7/2014 | Hutchison |
| 2014/0184496 A1 | 7/2014 | Gribetz |
| 2014/0185282 A1 | 7/2014 | Hsu et al. |
| 2014/0205976 A1 | 7/2014 | Peters et al. |
| 2014/0232825 A1* | 8/2014 | Gotschlich ......... H04N 13/0246 348/46 |
| 2014/0263224 A1 | 9/2014 | Becker |
| 2014/0263249 A1 | 9/2014 | Miller |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0320529 A1 | 10/2014 | Roberts |
| 2014/0326705 A1* | 11/2014 | Kodama ............ B23K 26/032 219/121.83 |
| 2015/0009316 A1 | 1/2015 | Baldwin |
| 2015/0056584 A1 | 2/2015 | Boulware |
| 2015/0072323 A1 | 3/2015 | Postlethwaite et al. |
| 2015/0125836 A1 | 5/2015 | Daniel et al. |
| 2015/0154884 A1 | 6/2015 | Salsich et al. |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | DeLisio |
| 2015/0248845 A1 | 9/2015 | Postlethwaite et al. |
| 2015/0304538 A1 | 10/2015 | Huang |
| 2015/0325153 A1 | 11/2015 | Albrecht |
| 2015/0352653 A1 | 12/2015 | Albrecht |
| 2015/0375324 A1 | 12/2015 | Becker |
| 2015/0375327 A1 | 12/2015 | Becker |
| 2015/0379894 A1 | 12/2015 | Becker |
| 2016/0027215 A1 | 1/2016 | Burns |
| 2016/0049085 A1 | 2/2016 | Beeson |
| 2016/0158884 A1* | 6/2016 | Hagenlocher ...... B23K 26/0884 219/121.85 |
| 2016/0183677 A1 | 6/2016 | Achillopoulos |

(56) References Cited

U.S. PATENT DOCUMENTS

| | | |
|---|---|---|
| 2016/0284311 A1 | 9/2016 | Patel |
| 2016/0365004 A1 | 12/2016 | Matthews |
| 2017/0053557 A1 | 2/2017 | Daniel |

FOREIGN PATENT DOCUMENTS

| | | |
|---|---|---|
| CN | 103170767 | 6/2013 |
| CN | 104384765 | 3/2015 |
| CN | 104599314 | 5/2015 |
| EP | 0165501 | 12/1985 |
| EP | 2082656 A1 | 7/2009 |
| EP | 2082656 A1 | 7/2009 |
| JP | S52126656 | 10/1977 |
| JP | 2002178148 | 6/2002 |
| JP | 2016203205 | 12/2016 |
| WO | 2008101379 A1 | 8/2008 |
| WO | 20081101379 A1 | 8/2008 |
| WO | 2009/137379 A1 | 11/2009 |
| WO | 20130122805 A1 | 8/2013 |
| WO | 2014188244 | 11/2014 |
| WO | 2015121742 | 8/2015 |
| WO | 2016044680 | 3/2016 |

OTHER PUBLICATIONS

Intelligent Robotic Arc Sensing, Lincoln Electric, Oct. 20, 2014, http://www.lincolnelectric.com/en-us/support/process-and-theory/pages/intelligent-robotic-detail.aspx (3 pages).

Handheld Welding Torch with Position Detection technology description, Sep. 21, 2011 (11 pages).

Lutwak, Dr. Robert, Micro-Technology for Positioning, Navigation, and Timing Towards PNT Everywhere and Always Stanford PNT Symposium, Stanford, CA Oct. 29, 2014 (26 pages).

Lutwak, Dr. Robert, DARPA, Microsystems Tech. Office, Micro-Technology for Positioning, Navigation, and Timing Towards PNT Everywhere and Always, Feb. 2014 (4 pages).

Wavelength Selective Switching, http://en.wikipedia.org/wiki/wavelength_selective_switching, Mar. 4, 2015 (5 pages).

Windows 10 to Get 'Holographic' Headset and Cortana, BBC News, www.bbc.com/news/technology-30924022, Feb. 26, 2015 (4 pages).

Li, Larry, Time-of-Flight Camera—An Introduction, Technical White Paper, SLOA190B—Jan. 2014, revised May 2014 (10 pages).

Heston, Tim, Lights, camera, lean—recording manufacturing efficiency, The Fabricator, Aug. 2010 (4 pages).

Int'l Search Report and Written Opinion for PCT/US2016/035473 dated Aug. 17, 2016 (15 pages).

G. Melton et al: "Laser diode based vision system for viewing arc welding (May 2009)", EUROJOIN 7, May 21, 2009 (May 21, 2009), XP055293872, Venice Lido, Italy, May 21-22, 2009.

Sergi Foix et al: "Exploitation of Time-of-Flight (ToF) Cameras IRI Technical Report", Oct. 1, 2007 (Oct. 1, 2007), pp. 1-22, XP055294087, Retrieved from the Internet: URL:http://digital.csic.es/bitstream/1 0261/30066/1 ltime-of-flight.pdf [retrieved on Aug. 8, 2016].

Gräser, Axel et al., "Virtual and Augmented Reality Supervisor for a New Welding Helmet" Nov. 15, 2005, pp. 1-150.

Patent Cooperation Treaty, Notification of Transmittal of the International Search Report and the Written Opinion of the International Searching Authority, in PCT/US2016/016107, dated May 17, 2016, 11 pages.

Patent Cooperation Treaty, Notification of Transmittal of the International Search Report and the Written Opinion of the International Searching Authority, in PCT/US2016/020865, dated May 11, 2016, 12 pages.

Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).

High Dynamic Range (HDR) Video Image Processing for Digital Glass, Augmented Reality in Quantigraphic Lightspace and Mediated Reality with Remote Expert, Raymond Lo, Sep. 12, 2012, https://www.youtube.com/Watch?v=ygcm0AQXX9k, YouTube screenshot submitted in lieu of the video itself.

ASH VR1-DIY Homebrew PC Virtual Reality Head Mounted Display HMD,' alrons1972, https://www.youtube.com/Watch?v=VOQboDZqguU, Mar. 3, 2013, YouTube screenshot submitted in lieu of the video itself.

Soldamatic Augmented Training, Augmented Reality World, May 30, 2013, https://www.youtube.com/watch?V=Mn0O52Ow_qY, YouTube screenshot submitted in lieu of the video itself.

Optical Head-Mounted Display, Wikipedia, Jun. 2, 2016, https://en.wikipedia.org/wiki/Optical_head-mounted_display 14 pages.

About Us.' Weldobot.com. <http://weldobot.com/?page_id=6> Accessed Jun. 2, 2016. 1 page.

International Search Report and Written Opinion corresponding to International Patent Application No. PCT/US2016/020861, dated May 23, 2016.

Hillers, Bernd, Iat Institut fur Automatislerungstechnik, doctoral thesis Selective Darkening Filer and Welding Arc Observation for the Manual Welding Process, Mar. 15, 2012, 152 pgs.

"High Dynamic Range (HDR) Video Image Processing for Digital Glass, Wearable Cybernetic Eye Tap Helmet Prototype," Raymond Lo, https://www.youtube.com/watch?v=gtTdiqDqHc8, Sep. 12, 2012, YouTube screenshot Submitted in lieu of the video itself.

Int'l Search Report and Written Opinion for PCT/US2015/067931 dated Jul. 26, 2016 (19 pages).

Cameron Series: "Why Weld Cameras Need Why High Dynamic Range Imaging", Apr. 10, 2013 (Apr. 10, 2013), XP055269605, Retrieved from the Internet: URL:http://blog.xiris.com/blog/bid/258666/Why-Weld-Cameras-Need-High-Dynamic-Range-Imaging [retrieved on Apr. 29, 2016] the whole document (5 pages).

AD-081CL Digital 2CCD Progressive Scan HDR/High Frame Rate Camera User's Manual, Jul. 1, 2012 (Jul. 1, 2012) p. 27, XP055269758, Retrieved from the Internet: URL:http://www.stemmer-imaging.de/media/up loads/docmanager/53730_JAI_AD-081_CL_Manual.pdf [retrieved on Apr. 29, 2016] the whole document (55 pages).

Anonymous: "JAI introduces unique high-dynamic-range camera", Nov. 5, 2009 (Nov. 5,2009), XP055269759, Retrieved from the Internet: URL:http://www.jai.com/en/newsevents/news/ad-081c1 [retrieved on Apr. 29, 2016] Typical HDR applications for the AD-081CL include inspection tasks where incident light or bright reflections are Oresent, such as . . . welding (2 pages).

NIT Image Processing Pipeline, R&D Report N RD1220-Rev B, May 14, 2012 (10 pages).

NIT Color Management, R&D Report N RD1113-Rev B, Apr. 11, 2011 (31 pages).

International Search Report and Written Opinion corresponding to International Patent Application No. PCT/US2016/012164, dated May 12, 2016.

Communication from European Patent Office Appin No. 18 150 120.6 dated Jun. 26, 2018 (9 pgs).

Int'l Search Report and Written Opinion for PCT/US2018/028261 dated Aug. 6, 2018 (17 pgs).

Mnich, Chris, et al., "In situ weld pool measurement using sterovision," Japan—UA Symposium on Flexible Automation, Denver, CO 2004.

Texas Instruments, Article, Time-of-Flight Camera—An Introduction, Larry Li, Technical White Paper, SLOA190B—Jan. 2014, Revised May 2014, (10 pages).

3D Mapping using a ToF Camera for Self Programming an Industrial Robot, N. Larkin, Z. Pan, S. Van Duin, J. Norrish, 2013 IEE/ASME Interenational Conference on Advanced intelligent Mechatronics (AIM), Wollongong, Australia, Jul. 9-12, 2013, (6 pages).

* cited by examiner

TIME OF FLIGHT CAMERA FOR WELDING MACHINE VISION

BACKGROUND

Weld operators and welding robot equipped with conventional optical cameras suffer from obscured vision in a harsh arc welding environment. The sharp light intensity contrast of welding arc and surroundings make it difficult to see the seam, electrode placement within the seam, torch and travel angles, liquid weld puddle shape and position, and finished weld size and position with good clarity. The problem is compounded with excessive fume and spatter conditions of certain wire, gas and welding processes.

Laser scanners overcome the arc brightness and fume obstruction but suffer from high cost and limited field of view, and are typically used for seam finding and tracking applications.

BRIEF SUMMARY

Methods and systems are provided for time of flight camera for welding machine vision, substantially as illustrated by and/or described in connection with at least one of the figures, as set forth more completely in the claims.

DETAILED DESCRIPTION

Figure 1A:
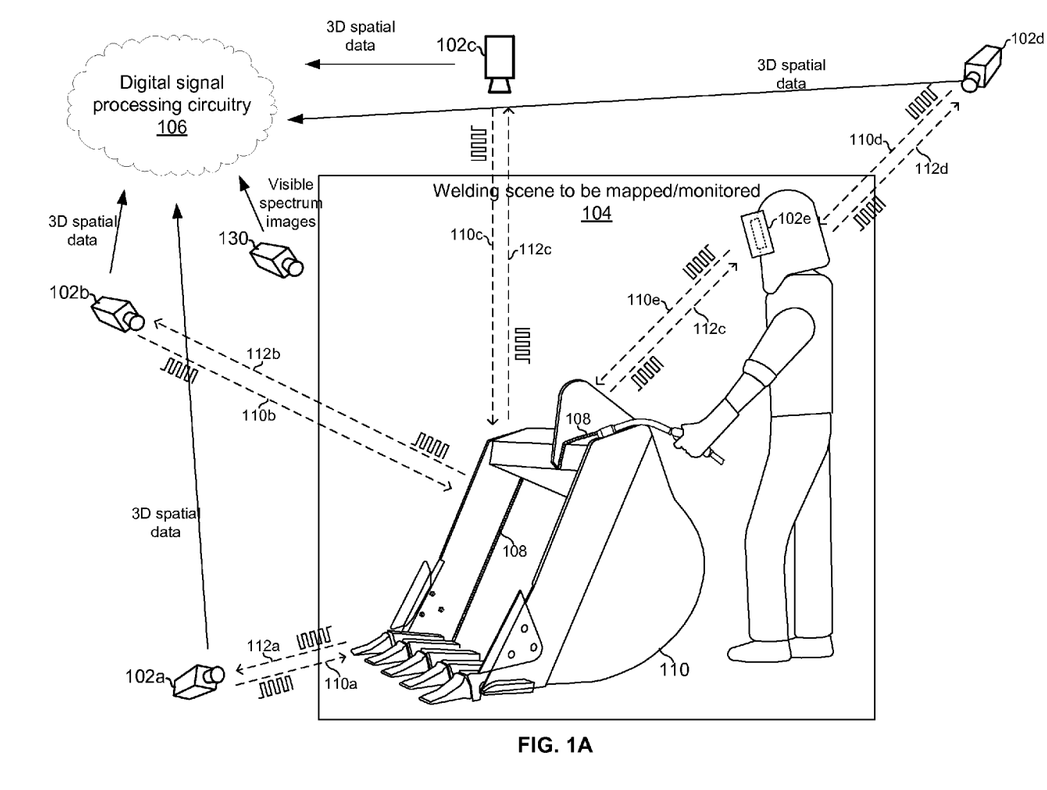
FIG. 1A illustrates monitoring of a fabrication work cell scene using time-of-flight (ToF) imaging.

FIG. 1A illustrates monitoring of a fabrication work cell (including welding, and pre-welding and post-welding activities, and other non-welding fabrication activities such as cutting, heating, brazing, induction heating, soldering, and/or the like) scene using time-of-flight (ToF) imaging. Shown are a plurality of ToF cameras 102a-102d monitoring a welding scene from a variety of distances and angles. The ToF cameras 102a-102d generate 3D spatial data (e.g., "point clouds") and convey that data via wired and/or wireless network to digital signal processing circuitry 106. The welding system 106 comprises welding equipment which may include, for example, a welding power source, a welding wire feeder, a welding gas flow regulator, a welding torch, a welding fixture for positioning workpieces to be welded, an automated welding robot, welding wearables (e.g., electronic headwear, wristbands, packs, etc.), a computer workstation for monitoring a welding process, a computer system for storing/recording welding data from the ToF camera(s) 102a-102d in addition to storing, for example, weld procedure specifications, CAD drawings/data, work orders, information about weld operators, and/or the like.

The ToF cameras 102a and 102e are mounted close to a weld seam (e.g., integrated into a welder helmet, into a welder's clothing or wearable such as glove, into the torch or weld tool, integrated in the end effector of a robot on the robot arm, mounted to the fixture holding the workpieces 24a and 24b, to the workpiece 24a or 24b itself, or to the torch 44) for generating a 3D map of the seam and area near the seam. For a ToF camera such as 102e integrated into a welding helmet, the helmet may have supporting circuitry to pre-process the depth image map, compress the images and wirelessly transmit the images to welding equipment. ToF cameras 102b, 102c, 102d are mounted at further distances (e.g., mounted on the ceiling if indoors or on a light fixture or building structure if outdoors), and a variety of angles to generate a map of the objects in the work area as a whole. Such a map may be useful for tracking workpieces, weld operators (activities), weld equipment, weld consumables, etc. Thus, for the example shown of a worker manually welding a large excavator bucket 110, a 3D map of the bucket 110 may be generated and used to ensure that welds 108 on the bucket are free of defects, done in the proper order, etc.

Figure 1B:
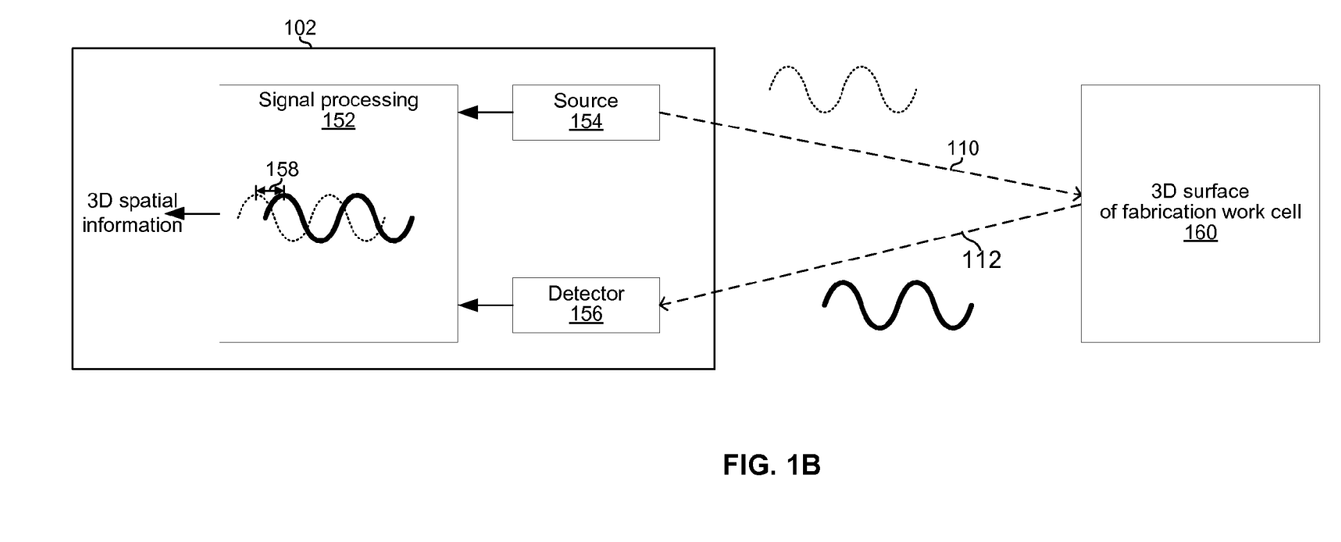
FIG. 1B illustrates depth measurement using a time-of-flight camera.

Now referring to FIG. 1B, shown is a ToF camera 102 which represents each of the ToF camera(s) 102a-102e. The light source 154 (e.g., laser) illuminates the welding scene (represented by 3D surface 160) with actively modulated light or light pulse(s) (represented by line 110). Reflections 112 of the light off of the 3D surface 160 of the fabrication work cell are received via the detector 156. Signal processing circuitry 152 of the TOF camera 102 then measures the phase shift 158 between the illumination 110 and reflection 112. The phase shift 158 is dependent on the time of flight of the light, and thus circuitry 152 can convert it to 3D spatial information for each point of the image. In this manner, the ToF camera 102 may capture the entire scene at once.

ToF cameras may perform well in both low-light and bright-light conditions, which helps for viewing the scene when the welding arc is present. Since the depth measurement is extracted from phase shift for ToF, the intensity contrast between the arc and the surrounding may have less effect on the measurement than when using structured light. ToF cameras may involve lower complexity to implement, provide faster response time (higher frame rate), be compact, cost-effective, without moving parts and without having to shape and/or scan the transmitted light such as in scanning light, structured light, and/or other such types of 3D measurement cameras which may be functional in an arc welding environment.

The ToF camera imager may have a CMOS pixel array designed to respond to the spectrum of the illumination light source, which may be different than the spectral peaks (ignoring peaks that are more than some determined threshold amount below the peak in the light source spectrum, as measured at the ToF camera imager) of the welding arc, so that the arc radiation and emission can be blocked out almost completely (or not responded to by the imager), thus achieving much improved signal to noise ratio. The light source may be an LED or laser diode, for example. For example, studies have shown that in pure argon GTAW welding, 10% $CO_2$ 90% argon blend GMAW welding and 5% $O_2$ 95% argon welding of steel, the near infrared spectra of arc shows a peak around 914 nm in addition to the peaks in the visible spectrum. Therefore, in this example, if the illuminating laser of the ToF camera is set to have a single peak at 980 nm wavelength (a longer wavelength than the 914 nm peak in the arc spectrum) or alternatively at 850 nm (a shorter wavelength than the 914 nm peak in the arc spectrum), such that the received power from the ToF light source is some threshold amount above the received power from the arc light in the passband of the imager, then the system may effectively block out the visible and near infrared arc spectrum emitted by the arc and have reliable 3D mapping of the welding scene.

Another benefit of using reflected light is that only solid objects effectively reflect light but not gaseous object such as arc plasma. The arc object does not reflect the illumination light as well as solid objects like welding wire (before and after being melted), molten metal in flight, spatter balls, contact tip, joint, weld pool surface and weld seam etc. Therefore the arc is mostly invisible to the ToF camera. However, arc light does provide a power level of illumination that is potentially much higher than the power of ToF illumination light source. Use of a non-integrating ToF sensor that does not integrate light over time and that uses a near infrared detector (such as InGaAs) to capture the reflected short laser pulse, is one example solution to this problem. The depth resolution may be improved by adaptively increasing the laser power in areas of the scene where arc is present, with the intensity information used as a confidence metric to improve accuracy with imaging process algorithms such as Kalman filter.

The monitoring of the activities in the fabrication cell with the ToF cameras may be beneficial in a variety of ways. For example, the data captured via the ToF cameras can be used for monitoring value-added activities (e.g. welding, cutting, grinding, etc.) and/or non-value added activities (e.g. to detect inefficiencies arising from workers going back and forth to pick up tools, drop off tools, fixing tools, waiting for materials to arrive and exit, waiting for other trades such as electrician to wire up his welding equipment or forklift operator to move WIP—work in process, etc.). Tracking and sorting these activities through use of the 3D spatial data may help the fabricator to "in-line" or streamline manufacturing operations, reduce MOH, improve throughput, quality, capacity, safety and ergonomics.

In an example implementation, the system may also comprise one or more non-ToF cameras 130, where a non-ToF camera may be operable to capture 2D or 3D (for a stereoscopic camera) images of, for example, the visible spectrum and/or infrared. The digital signal processing circuitry 106 may be operable to use the 3D spatial data from the ToF camera(s) 102 to supplement the images captured by the non-ToF camera(s) 130. For example, the combination of ToF data and visible spectrum images may be used to generate an augmented reality user interface where scene understanding gained from the ToF 3D map may be superimposed onto a high-dynamic range visible spectrum image. As another example, the combination of ToF data and IR images may be used to generate a 3D map with color mapping to indicate temperature. In an example implementation, a non-ToF camera and ToF camera may share optics as described below with reference to FIG. 7 (an illuminator, such as 216c (not shown in FIG. 7) may be adjacent to the shared optics).

Figure 2:
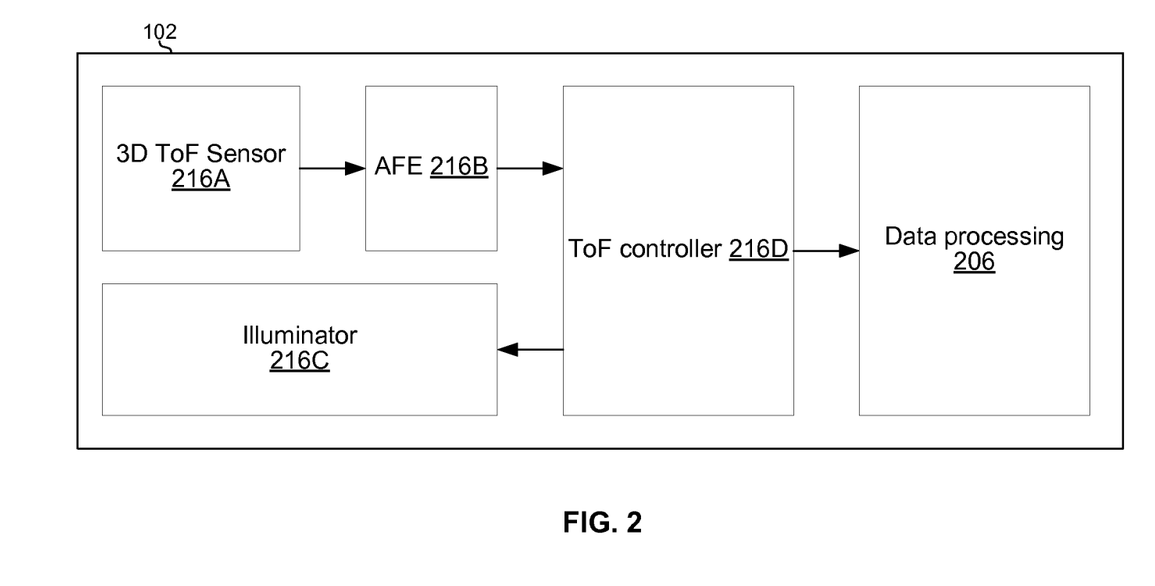
FIG. 2 illustrates an example implementation of a ToF camera.

FIG. 2 illustrates an example implementation of a ToF camera. The example ToF camera 102 comprises an ToF image sensor 216A, an analog front-end 216B, an illuminator 216C, a ToF controller 216D, and a communications interface 206.

The ToF image sensor 216A may comprise, for example, an addressable CMOS pixel array, with each pixel material tuned to respond to a specific optical wavelength. The wavelength may be chosen to match the wavelength emitted by illuminator 216C and different than wavelengths emitted by the welding arc.

The analog front-end 216B, may comprise, for example, an array of sample-and-hold circuits and high speed analog-to-digital converters (ADCs) for analog to digital conversion and serialization of the data output by ToF image sensor 216A.

The illuminator 216C may comprise, for example, a light emitting diode (LED), laser diode, and/or other light source.

The ToF controller 216D is operable to control the pixels scan, compute the depth measurement of each pixel, and performs de-aliasing, de-noising, frequency tuning and temperature compensation. The ToF controller 216D may be, for example, a state machine that controls and synchronizes the operation of 216A, 216B and 216C. In an example implementation, the controller 216D may acquire the serialized spatial data from AFE 216B into a collection of 3D points, each point called a voxel, forming a depth map. Tof controller 216D may render the depth map into a 3D space called a point cloud and may convert the point cloud into mesh models through a process called surface reconstruction. ToF controller 216D may transmit the spatial data (e.g., mesh model or point cloud) to data processing circuitry 206 (e.g., an FPGA, CPLD or SoC such as Xilinx's Zync) for digital image processing of the 3D point cloud. As an example implementation of the ToF camera 102, a 3-chip set solution from Texas Instrument can be used to implement FIG. 2. It may comprise a TOF imaging sensor (OPT81x0), the analog front-end (VSP5324) and a TOF controller (OPT91xx). Software from TI, SoftKinetic, Point-Cloud Library and OpenCV can be used for ToF camera image processing. Other implementations such as using 3D depth sensing electronics from Infineon are also possible.

Figure 3A:
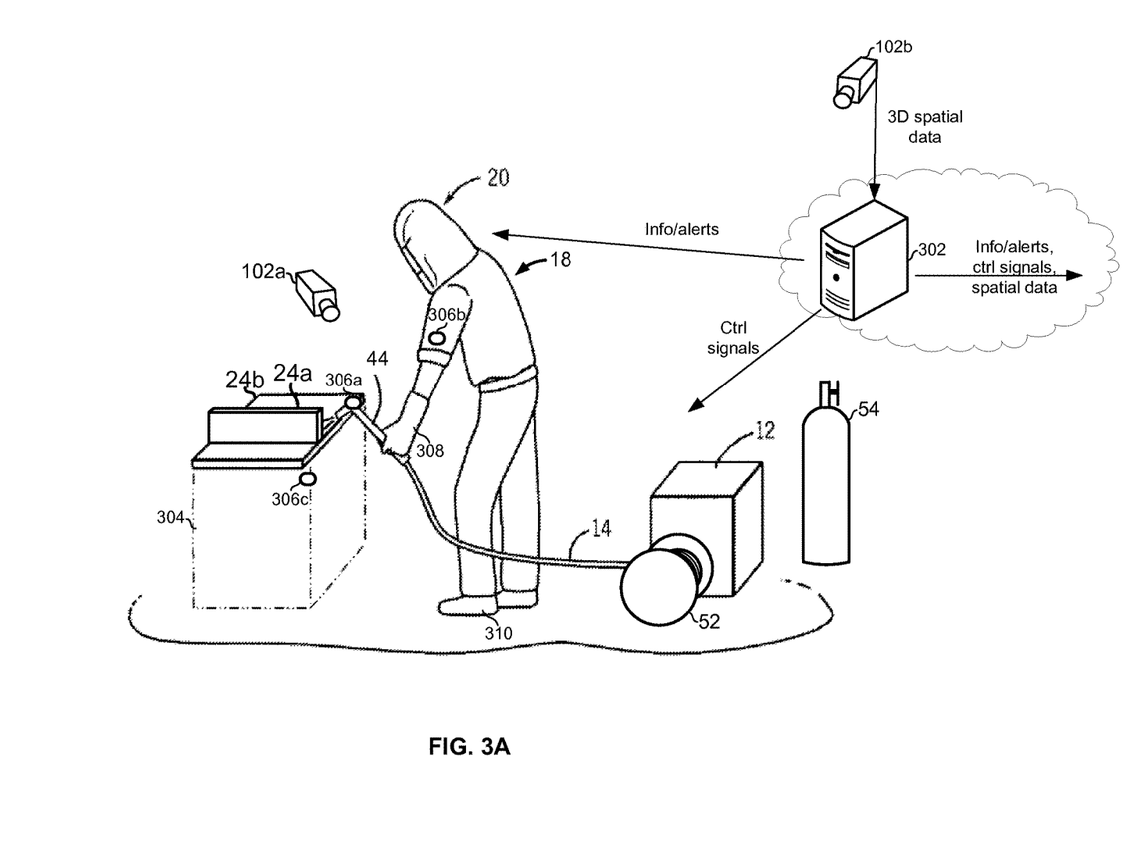
FIG. 3A illustrates monitoring of manual welding scene using one or more ToF cameras.

FIG. 3A depicts an example weld scene monitored by ToF cameras. The ToF cameras 102a and 102b capture the weld scene from multiple distances and angles. Spatial data captured by one the cameras 102a and 102b is relayed to resource 302 (e.g., a single computing device, an edge device, or networked group of computing devices). In another example implementation, circuitry for analyzing the spatial data may be integrated into the ToF camera(s) 102 and/or 102b, or some low complexity processing may be performed in the ToF camera(s) 102 and/or 102b and more advanced processing may be performed in the resource 302.

The resource 302 is operable to process the spatial data to identify and/or track various objects in the weld scene and take appropriate action based what is detected in the spatial data. For object tracking, the resource 302 may use known information for modeling/predicting the location of obscured objects. This may include, for example: last seen location and velocity of the various physical objects in the field of view (e.g., workpiece, seam, torch, electrode, weld puddle, etc., mechanical/CAD data for the various physical objects in the field of view, chemical or compositional data for the various physical objects, welding equipment settings and/or output (e.g., voltage, current, gas speed, and the like). Predicting location of the physical objects may also comprise modeling/predicting locations of obstructions such as smoke, spatter, arc brightness, etc.

Figure 3B:
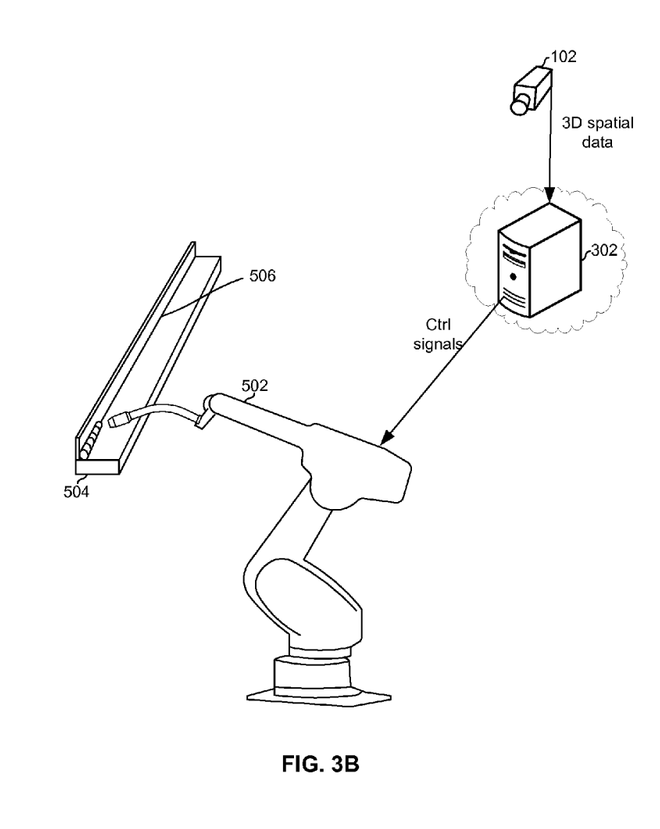
FIG. 3B illustrates monitoring of robotic welding scene using one or more ToF cameras.

In addition to resolving obscured objects, a priori knowledge of the welding scene (e.g., knowledge of welding operations performed in a particular "fabrication cell" of a factory, knowledge of welding equipment available for use in a particular fabrication cell, knowledge of weld operators who are authorized to work in a particular fabrication cell, etc) may aid "scene understanding" in general. Together with spatial data from one or more ToF cameras 102, the resource 302 can have a more holistic scene analysis based on exogenous and/or a priori knowledge. For example, probabilistic graphic models (PGMs) can be used to decipher the objects and their behavior in the scene, rather than relying solely on the spatial data from the ToC cameras. For example, the resource 302 may be configured to recognize that light streaks originating from the arc below the end of the welding wire and scattering at high speed outward are likely to be spatter balls. As another example, the resource 302 may have information as to the presence (and possibly location) of tack welds that exist in the joint and may take this information into account in its seam tracking algorithms (e.g., for guiding the manual weld operator 18 and/or controlling a welding robot such as shown in FIG. 3B). As yet another example, the resource 302 may be configured with predetermined limits on physical capabilities and/or parameters (e.g., in practice the torch 44 cannot be physically traveling above a certain speed, etc.). As yet another example, the resource 302 may store acoustic characteristics associated with various welding processes/parameters (e.g., a long arc may emit sound having a first set of frequencies, amplitudes, etc.; a short arc may emit sound having a second set of frequencies, amplitudes, etc.; and an ideal arc may emit sound having a third set of frequencies, amplitudes, etc.). Such multi-dimensional, multi-variable a priori knowledge collectively may be used for image segmentation, 3D object reconstruction, and scene interpretation. PGMs may employ methods like Bayesian networks and Markov random fields, or discrete data structures to encode and manipulate probability distributions in multi-dimensional spaces.

Based on the results of the processing of the spatial data, the resource 302 may, for example: generate alerts for the weld operator; generate control signals for controlling devices of the welding scene such as the welding equipment 12 (e.g., power source, wire feeder, shielding gas valve, etc.), and the ToF cameras 102a and 102b (e.g., focus, pan, tilt, etc.); and/or to send alerts, control signals, and/or data to remote locations (e.g., to network storage, to a remote monitoring station, or the like). The alerts for the operator may, for example, be output via an audio and/or video interface of the resource 302 and/or communicated to a wearable device such as helmet 20 of the operator 18.

In the example implementation shown, a first ToF camera 102a is positioned for capturing a relatively narrow field of view of the work pieces with good accuracy such as torch movement within one single weld joint, and camera 102b is positioned for a "bird's eye view" to track larger objects such as plurality of weld joints in the entire workpiece. In this manner, different angles and/or distances of the ToF cameras may provide fewer "blind spots" and/or higher resolution where such resolution may be valuable. The data from the two camera(s) 102a and 102b may be used separately and/or may be combined to render a single, more complete mapping of the weld scene. In other example implementations different numbers and/or positions of ToF cameras may be used.

The resource 302 may, for example, process the spatial data to identify the workpieces 24a and 24b being welded, to determine whether the workpieces are properly situated in the test fixture 304, to identify the equipment being used (e.g., which torch 44 and which power source 12 and which consumable electrode such as 52), and/or the like. Part or workpiece identification may help eliminate welding errors and can be used for automatic weld program generation and/or selection of a previously generated weld program. Fixture identification may be useful in manual welding to ensure the operator performs welds in a proper sequence (e.g., to manage deformation of the workpiece as described below with reference to FIG. 4). Weld tool identification may be used to ensure proper tool is used for a particular weld at a particular location. The resource 302 may, for example, process the spatial data to identify the weld operator 18. For example, the ToF camera(s) 102a and/or 102b may capture the scene with enough resolution such that facial recognition can be performed from the spatial data output by the ToF camera(s). The data may, for example, be compared against a database of spatial maps of authorized operators' faces. As another example, each weld operator may be given a uniquely shaped tag or some other physical object which may be easier to recognize based on the spatial data from the ToF camera(s). Once the operator 18 is identified, his or her welding credentials such as WPQ (welder performance qualification) may be retrieved from a database (e.g., to be used for quality control). The resource 302 may, for example, process the spatial data to identify welding consumables being used. For example, assuming a fabrication shop has two wires used in production, 035 wire and 045 wire. The 035 wire may have a rectangular tag and 045 has a round tag. At least one ToF camera is positioned to see the tag on wire 52 and is able to separate the rectangular tag from the round tag, thus identifying the wire 52 being used. Similar method can be used to identify other consumables such as shielding gas cylinder 54. In general, a birds-eye camera 102b in FIG. 3A may capture the welding critical materials and objects in the entire welding scene (including proper consumables 52) and visually check the objects against prescribed Welding Procedure Specification (WPS), check welding operator's performance qualification record (WPQ) and flag out noncompliance before welding is allowed to proceed. In comparison with barcode scanning of welding materials, objects and operator ID, ToF camera may reduce human interaction or labor to ensure WPS/WPQ compliance.

The resource 302 may, for example, process the spatial data to detect correct geometric features of 24a and 24b (size, shape, thickness) and determine if correct workpiece is loaded in the weld fixture 304 before welding on them. In an assembly line, this detection is important to ensure the previous workstation does its manufacturing process properly on the workpiece in the workflow before allowing the present step to take place.

The resource 302 may, for example, process the spatial data to detect fit-up conditions of 24a and 24b and if they are assembled properly prior to allowing welding to take place on them.

The resource 302 may, for example, process the spatial data to assist robot to "find" the seam or the starting point of a weld, where the fit-up and/or part distortion may cause variations of the weld location in space.

The resource 302 may, for example, process the spatial data to measure welding torch 44 travel speed, work angle, travel angle, and weld position especially from a ToF camera mounted in a stationary position overlooking the torch and human operator movement. It is possible that the torch 44 may contain IR reflector(s) 306a that reflect a wavelength matching that of the ToF camera illumination. The torch could be welding in production or the torch could be a training tool for weld operator training. In addition to, or instead of, capturing the torch motion parameters, the ToF camera(s) 102a and/or 102b may capture rich operator techniques and dexterity such as they way s/he holds the torch 44 and cable 14, and how s/he moves the arm, fingers, back, head, elbow or feet. With and without IR reflectors 306c on the weld fixture, a ToF camera 102 mounted to helmet 20 may be able to use the stationary weld fixture 304 to compute the torch movement parameters to the stationary fixture 304 and workpieces 24a and 24b, such as torch angle, travel angle and travel speed. This allows torch motion tracking in, for example, 360 degree pipe welding where line of sight to the torch 44 may be most conveniently obtained by the helmet vantage point, rather than a bank of fixed cameras surrounding the pipe. In one example, the ToF camera(s) 102a and/or 102b may be configured to have different wavelengths and different IR reflectors (such as 306a on the torch 44, 306b on the operator's clothing, and 306c on the weld fixture) may have different matching wavelengths for different tools or activities, to increase signal-to-noise ratio and reduce image processing complexity. For example, camera 102a may have an imager tuned to 980 nm to track location and movement of torch 44 with 980 nm reflector(s) 306a. Camera 102b may have an imager tuned to 985 nm to track location and movement of 985 nm reflector(s) 306b on the clothing of operator 18 to track the operator inside the work cell. In other scenarios additional camera(s) 102 and reflector(s) 306 may be present. For example, camera 102c (not shown in FIG. 3A) may have an imager tuned to 990 nm to track location and movement of 990 nm reflector(s) on a grinder (not shown in FIG. 3A) for grinding operation in the work cell. In general, all shop floor movement may be tracked, such as human, manufactured part, work in process (WIP), hand tools, automated tools or robots, welding consumables, etc. By tracking human interaction of the tools and materials inside a manufacturing cell, the data captured by the ToF cameras can be used to 1) minimize human interaction or handling or non-value added activities such as walking back and forth; 2) design or incorporate "in-lining" techniques to improve work-flow; 3) improve safety and ergonomics g) observe and prevent mistakes or near-misses or potential hazards; 5) improve cycle time, manufacturing efficiency and productivity; 6) train workers.

The resource 302 may, for example, process the spatial data to detect weld fixture 304 conditions (e.g., that workpieces 24a and 24b are held down and if they are in good order and if all the clamps are engaged prior to welding).

The resource 302 may, for example, process the spatial data to tack welds between workpieces 24a and 24b and if they are indeed welded (absence detection) and in good order prior to welding. In addition, during welding process, if the arc is going over a previously welded tack weld, the spatial data from the ToF camera(s) may be used for automatic feed-forward control of the welding equipment to adapt the welding parameters or torch position/orientation for going over a tack.

The resource 302 may, for example, process the spatial data to detect adequate supply of welding consumables e.g. sufficient wire left on the spool 52, and sufficient weld flux in the hopper or flowing down to cover the sub-arc torch for sub-arc welding (not shown) prior to welding.

The resource 302 may, for example, process the spatial data to detect if the torch 44 is bent e.g. due to robot collision prior to welding. The resource 302 may, for example, process the spatial data to be vigilant in robot moves with respect to its surroundings during the active weld cycle of the robot and automatically take action (e.g., shut down or re-route a robot) to prevent a collision about to take place.

The resource 302 may, for example, process the spatial data to detect if the nozzle of torch 44, contact tip of torch 44, and/or weld fixture 304 have collected too much spatter. The resource 302 may, for example, process the spatial data to detect if the MIG wire liner is bent or broken, or if the gas hose is pinched, or if the cable 14 is frayed or cracked. Upon detecting any of these, or any other undesirable condition, the resource 302 may automatically generate an alert and/or take action (e.g., lock out the trigger of torch 44) to prevent an accident, damage, etc.

The resource 302 may, for example, process the spatial data to detect poor physical welding grounding cable connections, sizes, arrangements and practice to avoid arc blow, arc interference, and arc instability.

The resource 302 may, for example, process the spatial data to detect thickness of the workpiece(s) 24a and/or 24b and automatically control welding equipment to configure welding equipment (e.g., choose a welding program from a database of programs) commensurate with the workpiece thickness seen by the ToF camera(s) 102.

The resource 302 may, for example, process the spatial data to detect the joint type on the workpiece (e.g. fillet, groove, butt, etc.) and automatically choose a welding program commensurate in a weld database stored in the welding equipment/robot with the joint type seen by the ToF camera(s) 102.

The resource 302 may, for example, process the spatial data to detect weld position of the torch (e.g. 1F, 2F, 3F, 1G, 2G, 3G, 4G, 5G, PA, PB, PC, PD, PE, PF, PG) and automatically choose a welding program commensurate with the weld position seen by the ToF camera(s) 102. Alternatively, the weld position, along with torch angle, travel angle, travel speed measurement may be used to adjust welding parameters adaptively as the weld progresses, for example in all position pipe welding.

The resource 302 may, for example, process the spatial data to detect hand gestures and use the hand gestures as user interface to control welding parameters or selecting weld programs or weld sequencing system such as Miller Insight CenterPoint or interact with the welding equipment in general.

The resource 302 may, for example, process the spatial data to feed depth maps to machine learning (ML) algorithms such as a neural network for weld quality inspection and preventative maintenance in supervised learning, and for anomaly detection in unsupervised learning.

The resource 302 may, for example, process the spatial data to detect appropriate safety precautions are being used. For example, the resource 302 may be operable to analyze the spatial data to detect whether the operator 18 is wearing appropriate safety equipment (e.g. personal protective equipment such as helmet 20, safety glasses or helmet 40, gloves 308, and footwear 310) compliance, and whether appropriate bracing is in place, whether fire extinguishers are in their designated place, etc.

The resource 302 may, for example, process the spatial data to measure actual weld length and width, and do so collectively for the entire workpiece. For example, missing welds, weld off the seam, undersized welds and oversized welds may be detected and recorded. In this regard, in contrast with scanning light, structured light and/or other technologies than scan the weld locally and do not have a sufficiently wide perspective/field of view, a ToF camera positioned at an appropriate location can view, for example, the entire workpiece and fixture, measure the weld length and width, count the number of welds, identify location of completed welds, identify locations of welds yet to be performed, etc. The resource 302 may then be operable to compare such measurements CAD drawings, work specifications, etc. (e.g., for quality control).

The resource 302 may, for example, process the spatial data to perform visual inspection of weld quality. For example, it may be used to detect observable defect such as burn-through, lack of fusion, surface porosity, surface crack, severe undercut, severe spatter in addition to gross problems such as missing welds.

The resource 302 may, for example, process the spatial data to measure the overall workpiece distortion.

The resource 302 may, for example, process the spatial data to measure weld pool size during welding. The size of the weld pool may then be used to adaptively control the welding equipment for controlling penetration and preventing burn through and/or defects. The resource 302 may, for example, process the spatial data to measure and control fit-up and penetration during welding in manual welding and in automated welding. It may be possible to see the gap opening ahead of the weld puddle for automatic, feed-forward control to reduce heat and avoid burn-through; or to see the hole in solidifying weld puddle for feed-back control to engage weave or other means to reduce or spread the heat out.

The resource 302 may, for example, process the spatial data to monitor the actions of the weld operator 18. For example, if the weld operator makes movements or takes actions which indicate s/he is attempting to perform an out-of-sequence weld, the resource 302 may generate an alert to the operator 18 and/or send a signal to disable the torch 44 so that human error of welding in the wrong sequence can be avoided.

The resource 302 may, for example, process the spatial data to track teach points shown by a weld operator, or a robot under control of a weld operator (e.g., using a teach pendant), to record/generate a welding program that can later be implemented by a robot without manual guidance.

FIG. 3B illustrates monitoring of robotic welding scene using one or more ToF cameras. Shown in FIG. 3B, a robotic welder 502 is welding seam 506 of workpiece 504. The robotic welder 502 is controlled by resource 302 which guides the robotic welder 502 based on spatial data from ToF camera 102. The camera 102 is positioned so as to capture sufficiently high-resolution spatial data of the area surrounding the arc so that the resource 302 can reliable detect the seam 506 from the spatial data and guide the robotic welder 502. The robot is one example of an automation device. An automation device may be a hard automation device, a soft automation device, or a flexible automation device.

In another example, workpiece 504 is one-of-kind workpiece to be repaired by robot 502 and no robot program exists to repair a defect in a previously welded seam 506. A 3D map of 504 is generated from ToF data captured by camera 102, camera 102 and/or resource 302 processes the map to identify the defect, and make a custom, ad-hoc program for robot 502 to patch up the defect adaptively. A ToF-camera-equipped robotic welding cell allows the robot 502 to make custom fabrication adaptively based on the ToF analysis of the custom workpiece loaded before the robot.

Figure 6:
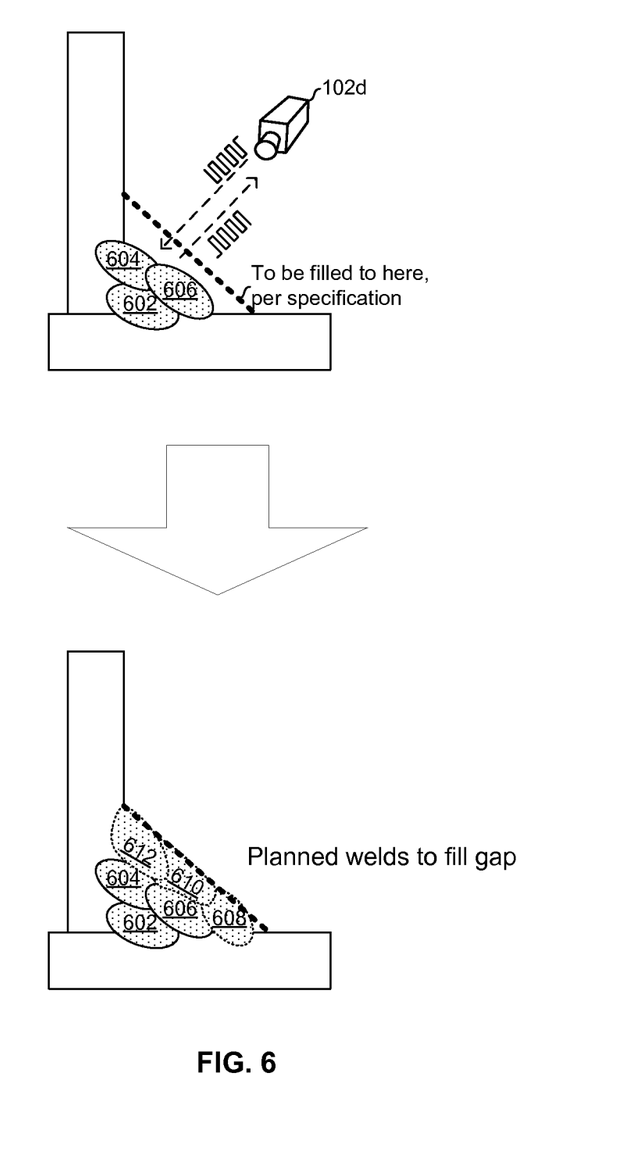
FIG. 6 illustrates use of a ToF camera for adaptive multi-pass welding

One specific example of weld program customization is multi-pass welding and multi-pass cladding. That is, a ToF camera may be used to perform adaptive multi-pass welding. Because the actual bead shape and thickness may vary, the actual bead stack-up from previous passes may be captured by the ToF camera and compared to the finished weld geometry specified by the drawing. For example, referring to FIG. 6, when pass 602, 604, and 606 are finished, the ToF camera 102 may capture a 3D map of the stack up, and an adaptive fill algorithm may use the captured 3D map to plan for the remaining passes such as their locations and sizes to fill the remain space. In the example, the algorithm plans for remaining passes 608, 610, and 612. When, for example, passes 602, 604, and 606 are smaller, then passes 608, 610, and 612 may be made bigger to compensate.

In another example, it is possible that the robot welder 502 is not mounted at fixed pedestal but an autonomous mobile robot, such as one manufactured by Robotic Technologies of Tennessee (RTT) with no peripheral fence or safety devices to keep people out of reach. A ToF camera may be mounted on such a robot operating in an unstructured work environment such as shipyard to ensure safety with human workers in close proximity.

Figure 4:
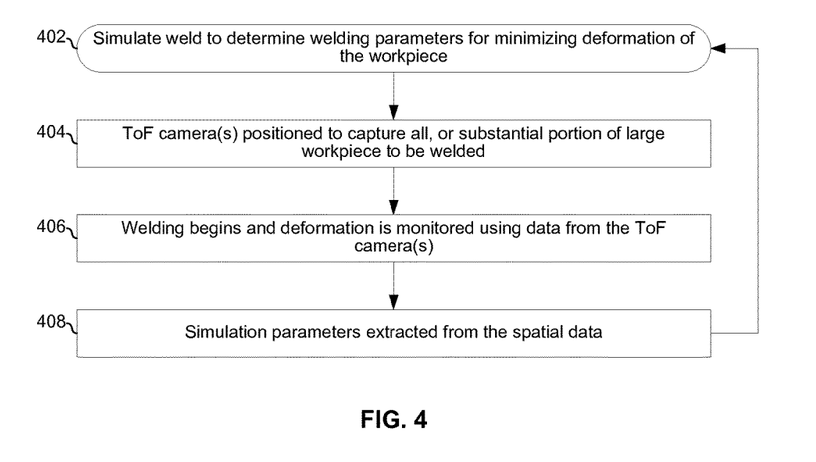
FIG. 4 is a flowchart illustrating an example process for monitoring and managing welding workpiece distortion using a ToF camera.

FIG. 4 is a flowchart illustrating an example process for monitoring and managing welding workpiece distortion using a ToF camera. In block 402, finite element thermodynamic models for a workpiece and welding process are used to simulate deformation of the workpiece during welding and determine parameters (e.g., weld equipment heat input settings, sequence in which various welds are to be performed on the workpiece, etc.) to be used for controlling (e.g., minimizing) deformation of the workpiece. In block 404, one or more ToF cameras are positioned to capture the workpiece from one or more angles during welding. In block 406, the ToF cameras capture spatial maps of the workpiece during welding and use the spatial data to measure deformation of the workpiece. As compared to scanning or structured light or other scanning techniques, use of ToF camera(s) may enable capturing all, or at least a very large portion, of the workpiece which may enable the deformation measurements. In block 408, various parameters (actual measured deformation, which welds have been completed, etc.) are extracted from the spatial data captured by the ToF cameras. Then the process returns to block 402 in which the simulation is re-run using the updated information (i.e., the extracted parameters). In this manner, the weld sequencing, weld equipment settings, and/or other factors that influence deformation may be refined during the welding process. The welding parameters and results of the simulations may also be used to refine the models for future simulations.

Figure 5:
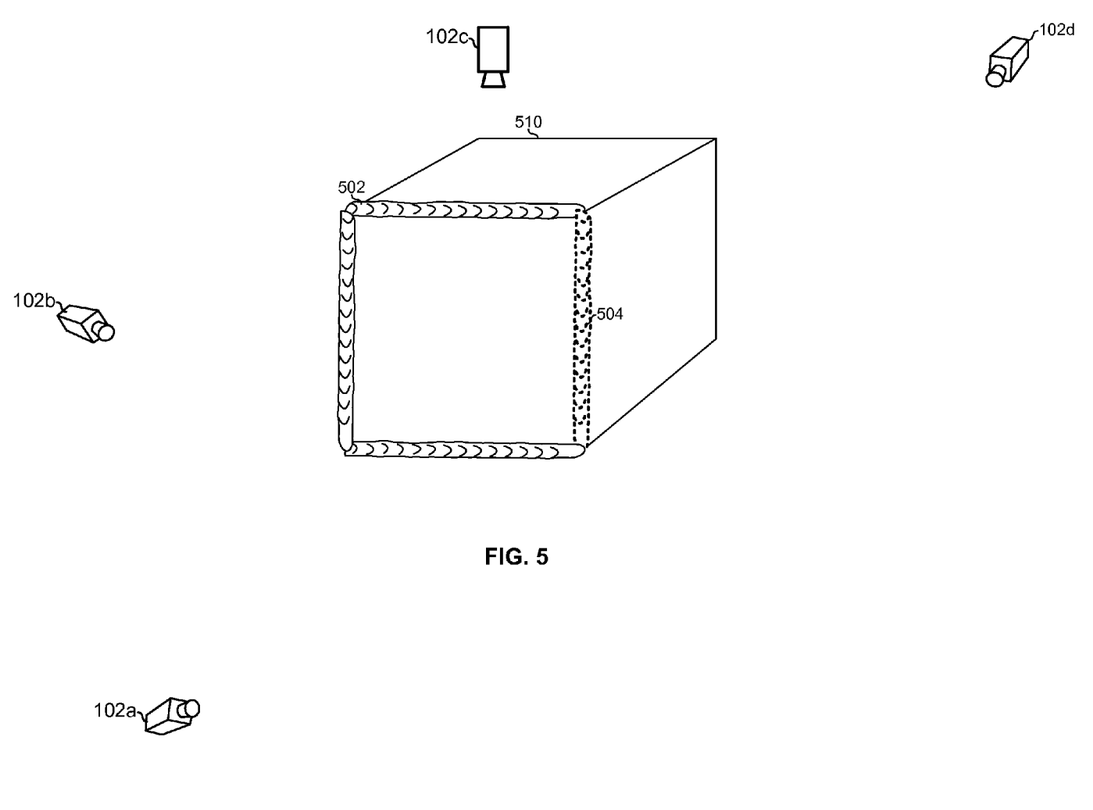
FIG. 5 depicts weld sequencing control using spatial data collected by one or more ToF cameras monitoring a fabrication cell.

FIG. 5 depicts weld sequencing control using spatial data collected by one or more ToF cameras monitoring a fabrication cell. FIG. 5 depicts weld sequencing control using spatial data collected by one or more ToF cameras monitoring a fabrication cell. In FIG. 5 the workpiece 510 is a box with 12 edge welds, is be welded in sequence to avoid distortion of the workpiece 102. As the welder completes weld 502, the ToF cameras continuously capture and update a 3D map of the workpiece 510 to determine which welds have been completed, are in progress, and should be performed next. The determination of which weld should be performed next may be, for example, based on historical data and/or current distortion of the workpiece 510 as measured on the 3D map. Alternatively, the determination of the next weld is based on a planned weld sequence according to manufacturing drawing or specification. Audio and/or visual alerts (e.g., send to a helmet of the operator) may then be used to guide the operator to the next weld. In an example implementation, if the operator makes movements, equipment preparations, etc. that indicate s/he is attempting to perform an out-of-sequence weld, this may be detected from the 3D map of the fabrication cell and a signal may be sent (e.g., by a ToF camera or resource such as 302) to disable the trigger of the torch so that human error of welding in the wrong sequence can be avoided.

Figure 7:
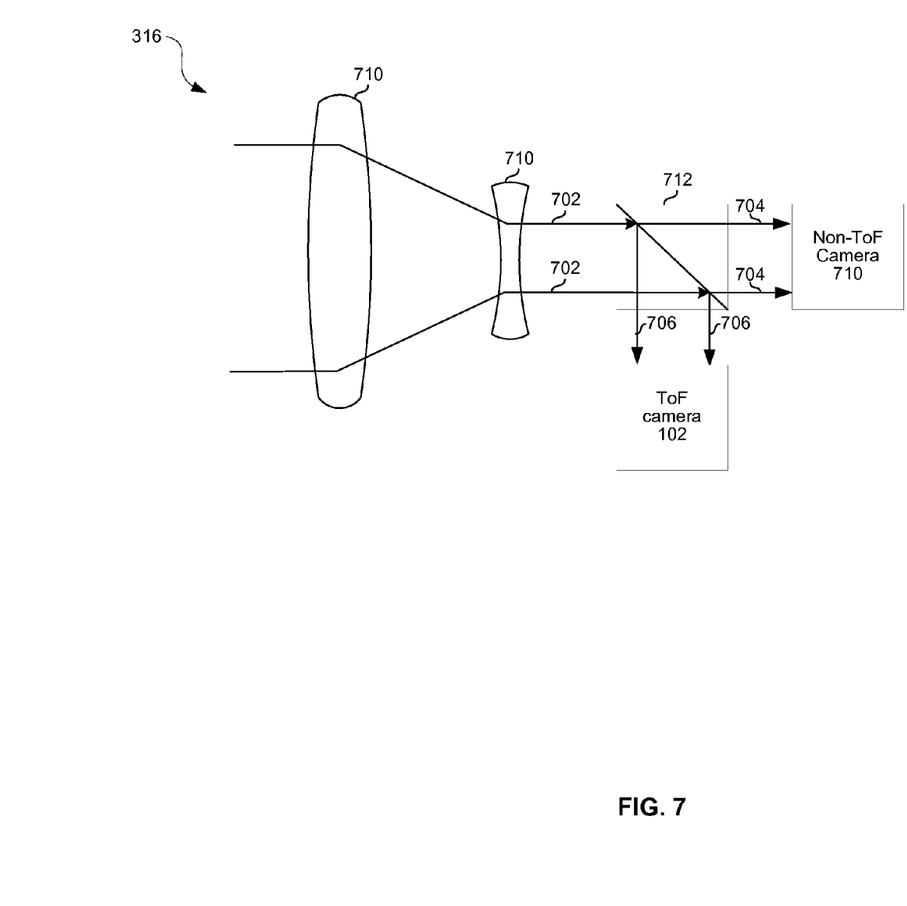
FIG. 7 illustrates sharing of optical components between a ToF camera and a non-ToF camera.

Now referring to FIG. 7, there is shown an example implementation where a ToF camera 102 and a non-ToF camera (e.g., visible spectrum and/or IR) 710 share optics such that the imagers of the two cameras are concurrently exposed to the same image. The optics include lenses 710 and beam splitter 712 such that light beams 702 are focused onto beam splitter 712 by lenses 710. A first portion of beams 702 are reflected by the splitter 712 to arrive at non-ToF camera 710 as beams 706. A second portion of beams 702 pass through the splitter 712 to arrive at ToF camera 102 as beams 706.

In accordance with an example implementation of this disclosure, a machine-vision-assisted welding system comprises welding equipment (e.g., torch 144, equipment 12, gas cylinder 54, fixture 304, robot 504, etc.), a first Time of Flight (ToF) camera (e.g., 102a) operable to generate a three-dimensional (3D) depth map of a welding scene, digital image processing circuitry (e.g., 206 and/or circuitry of resource 302) operable to extract welding information from the 3D depth map, and circuitry (e.g., circuitry of resource 302) operable to control a function of the welding equipment based on the extracted welding information. The system may comprise an image sensor (e.g., 216A) comprising a plurality of pixels, each of which is operable to convert light energy incident on it to an electrical signal, and circuitry (e.g., 216D and/or 206) operable to, for each one of the pixels, measure time required for light to travel from a light source (e.g., 216C) to the welding scene and back to the one of the pixels. The welding equipment may comprise, for example, arc welding equipment that forms an arc during a welding operation, and a light source (e.g., 216C) of the first ToF camera may emit light whose spectrum comprises a peak that is centered at a first wavelength, wherein the first wavelength is selected such that a power of the peak, as measured by at least one of the pixels of the imager of the first ToF camera after reflection off of the welding scene, and after any optical filtering in the first ToF camera, is at least a threshold amount above a power of light from the arc at the first wavelength, as measured by the at least one of the pixels at the imager of the first ToF camera after any optical filtering in the first ToF camera (i.e., a sufficient signal-to-noise ratio, where the power from the light source is the signal and the power from the arc (and other ambient light) is noise). For the extraction of the welding information, the digital image processing may be operable to perform probabilistic graphic modeling using data from sources other than the first ToF camera to interpret the 3D depth map. The system may comprise a second ToF camera, wherein the first ToF camera and the second ToF camera differ in one or more of: field of focus, mounting location, wavelength of light used, and targets viewed.

The extracted welding information may characterize activity of one or both of a human and a machine in the welding scene. The activity may comprise one or more of: welding operations, pre-welding operations (e.g., joint preparation, and loading the workpiece into weld fixture), and post-welding operations (e.g., unloading the workpiece from the fixture, and removing weld spatter and slag). The function may comprise activity tracking, cycle time improvement based on tracked activity, and workflow streamlining based on tracked activity. The function may comprise characterizing the risk of injury to persons in the fabrication cell (e.g., risk of a robot injuring a person, risk of a person being injured due to poor ergonomics, etc.).

The extracted welding information may comprise identification of one or more of: welding equipment, welding consumables, and welding operator, and the function may comprise one or more of: verification of compliance with a welding procedure specification (WPS), welder performance qualification (WPQ), and generation of alerts for error prevention.

The extracted welding information may identify a sequence of welds being made on a workpiece in the welding scene, and the function may comprise one or both of: indication, via a user interface of the welding equipment, of a location of a next weld in the sequence; and generation of an alert or trigger lock-out for prevention of wrong weld sequence.

The extracted welding information may comprise joint fit-up condition of a workpiece in the welding scene, and the function may comprise adaptation of welding parameters (e.g., current, voltage, wire speed, location of contact tip, type of electrode, type of filler material, etc.) used by the welding equipment based on the fit-up condition.

The extracted welding information may comprise actual joint seam location, and the function may comprise guiding a robot of the welding equipment to ensure a welding tool center point follows the joint seam.

The extracted welding information may indicate a maintenance condition of the welding equipment, and the function may comprise one or both of: preventative maintenance service, and condition-based maintenance service tracking and alert generation.

The extracted welding information may indicate remaining stock of welding consumables, and the function may comprise generation of an alert to replenish a supply of welding consumables.

The extracted welding information may indicate an identity and joint location within a welding workpiece in the welding scene, and the function may comprise automatic selection of a weld program to be used for welding the workpiece, based on the identity and joint location within the welding workpiece.

The extracted welding information may indicate hand gestures made by a worker in the welding scene, and the function may comprise controlling the welding equipment based on the hand gestures.

The function may comprise acquisition of 3D depth data of the welding scene for machine learning and predictive analytics.

The extracted welding information may comprise one or more of: weld presence or absence, weld size, weld length, weld location, workpiece distortion, and weld appearance, and the function may comprise post-welding visual inspection of weld quality.

The extracted welding information may be frequency and/or amplitude of surface oscillations of a weld puddle formed during an arc welding process, and the function may comprise controlling the current, voltage, contact tip to work distance, travel speed, wire speed, and/or other arch welding parameters based on the surface oscillations in order to control the penetration of the weld and prevent burn through.

The function may comprise the display of information (e.g., on a computer display and/or on a display mounted inside a welder's headwear), and this function may be controlled by adjusting on-screen graphics and/or characteristics (e.g., contrast, color, digital zoom/cropping, etc.) of the display based on the extracted welding information.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A machine-vision-assisted welding system comprising:
    welding equipment;
    a first Time of Flight (ToF) camera operable to generate a three-dimensional (3D) depth map of a welding scene, wherein the first ToF camera is configured to capture a 3D map of an actual bead stack up;
    digital image processing circuitry operable to extract welding information from said 3D depth map and compare the 3D map of the actual bead stack-up to a desired weld geometry; and
    circuitry operable to control a function of said welding equipment based on said extracted welding information and said comparison.

2. The machine-vision-assisted welding system of claim 1, wherein said welding equipment comprises an automation device.

3. The machine-vision-assisted welding system of claim 1, wherein said welding equipment is operated by a human operator.

4. The machine-vision-assisted welding system of claim 1, comprising:
    an image sensor comprising a plurality of pixels, each of which is operable to convert light energy incident on it to an electrical signal; and
    circuitry operable to, for each one of said pixels, measure time required for light to travel from a light source of said ToF camera to said welding scene and back to said one of said pixels.

5. The machine-vision-assisted welding system of claim 1, wherein:
    said welding equipment comprises arc welding equipment that forms an arc during a welding operation; and
    a light source of said first ToF camera is configured to emit light whose spectrum comprises a peak that is centered at a first wavelength, wherein said first wavelength is selected such that a power of said peak, as measured at a particular pixel of an imager of said first ToF camera after reflection off of said welding scene, is at least a threshold amount above a power of light from said arc at said first wavelength, as measured at said particular pixel of said imager of said first ToF camera.

6. The machine-vision-assisted welding system of claim 1, wherein:
    said extracted welding information characterizes activity of one or both of a human and a machine in said welding scene; and
    said function comprises activity tracking, cycle time improvement, and workflow streamlining.

7. The machine-vision-assisted welding system of claim 6, wherein said activity comprises one or more of: welding operations, pre-welding operations and post-welding operations.

8. The machine-vision-assisted welding system of claim 1, wherein:
    said extracted welding information comprises activity of one or both of a human and a machine in said welding scene; and
    said function comprises real-time assessment of risk of personal injury.

9. The machine-vision-assisted welding system of claim 1, wherein said digital image processing circuitry uses data from sources other than said first ToF camera to interpret said 3D depth map.

10. The machine-vision-assisted welding system of claim 1, comprising a second ToF camera, wherein said first ToF camera and said second ToF camera differ in one or more of: field of focus, mounting location, wavelength of light used, and targets viewed.

11. The machine-vision-assisted welding system of claim 1, comprising a non-ToF camera configured to capture visible-spectrum images, wherein said information from said depth map and visible-spectrum images are combined to provide an augmented reality user interface.

12. The machine-vision-assisted welding system of claim 1, comprising a non-ToF camera configured to capture infrared images, and being configured to use said infrared images to provide a temperature overlay on said 3D depth map.

13. The machine-vision-assisted welding system of claim 1, wherein:
said extracted welding information comprises identification of one or more of: welding equipment, welding consumables, and welding operator; and
said function comprises one or more of: verification of compliance with a welding procedure specification (WPS), welder performance qualification (WPQ), procedure qualification record (PQR), and generation of alerts for error prevention.

14. The machine-vision-assisted welding system of claim 1, wherein:
said extracted welding information identifies a sequence of welds being made on a workpiece in said welding scene; and
said function comprises one or both of:
indication, via a user interface of said welding equipment, of a location of a next weld in said sequence; and
one or both of generation of an alert and triggering of a lock out for prevention of wrong weld sequence.

15. The machine-vision-assisted welding system of claim 1, wherein:
said extracted welding information comprises frequency and/or amplitude of surface oscillations of a weld puddle; and
said function comprises controlling said welding equipment based on said frequency and/or amplitude of said surface oscillations.

16. The machine-vision-assisted welding system of claim 1, wherein:
said extracted welding information comprises joint fit-up condition of a workpiece in said welding scene; and
said function comprises adaptation of welding parameters used by said welding equipment based on said fit-up condition.

17. The machine-vision-assisted welding system of claim 1, wherein:
said extracted welding information comprises actual joint seam location; and
said function comprises guiding a robot of said welding equipment to ensure a welding tool center point follows said joint seam.

18. The machine-vision-assisted welding system of claim 1, wherein:
said extracted welding information indicates maintenance condition of said welding equipment; and
said function comprises one or both of:
preventative maintenance service; and
condition-based maintenance service tracking and alert generation.

19. The machine-vision-assisted welding system of claim 1, wherein:
said extracted welding information indicates remaining stock of welding consumables; and
said function comprises generation of an alert to replenish a supply of said welding consumables.

20. The machine-vision-assisted welding system of claim 1, wherein:
said extracted welding information indicates an identity and position of a welding workpiece in said welding scene; and
said function comprises automatic selection of a weld program to be used for welding said workpiece, based on said identity and position of said welding workpiece.

21. The machine-vision-assisted welding system of claim 1, wherein:
said extracted welding information indicates a position and orientation of a welding torch in said welding scene; and
said function comprises automatic generation of a weld program to be used by an automated robot for welding said workpiece.

22. The machine-vision-assisted welding system of claim 1, wherein:
said extracted welding information indicates an identity and position of a welding workpiece in said welding scene; and
said function comprises automatic selection of a weld program to be used for welding said workpiece, based on said identity and position of said welding workpiece.

23. The machine-vision-assisted welding system of claim 1, wherein:
said extracted welding information indicates the dimensions of previous welds in a multi-pass weld or clad of the welding workpiece in said welding scene; and
said function comprises automatic planning of the remaining one or more passes to be used for multi-pass welding of the said workpiece, based on a previous one or more welding passes on said welding workpiece.

24. The machine-vision-assisted welding system of claim 1, wherein:
said welding information indicates hand gestures made by a worker in said welding scene; and
said function comprises controlling said welding equipment based on said hand gestures.

25. The machine-vision-assisted welding system of claim 1, wherein said function comprises acquisition of 3D depth data of said welding scene for machine learning and predictive analytics.

26. The machine-vision-assisted welding system of claim 1, wherein:
said welding information comprises one or more of: weld presence, weld size, weld length, weld location, workpiece distortion, and weld appearance, and
said function comprises post-welding visual inspection of weld quality.

* * * * *